July 31, 1962 H. W. THOMPSON ETAL 3,047,342
TRACK SHOE FOR CRAWLER TYPE VEHICLE
Filed June 9, 1961
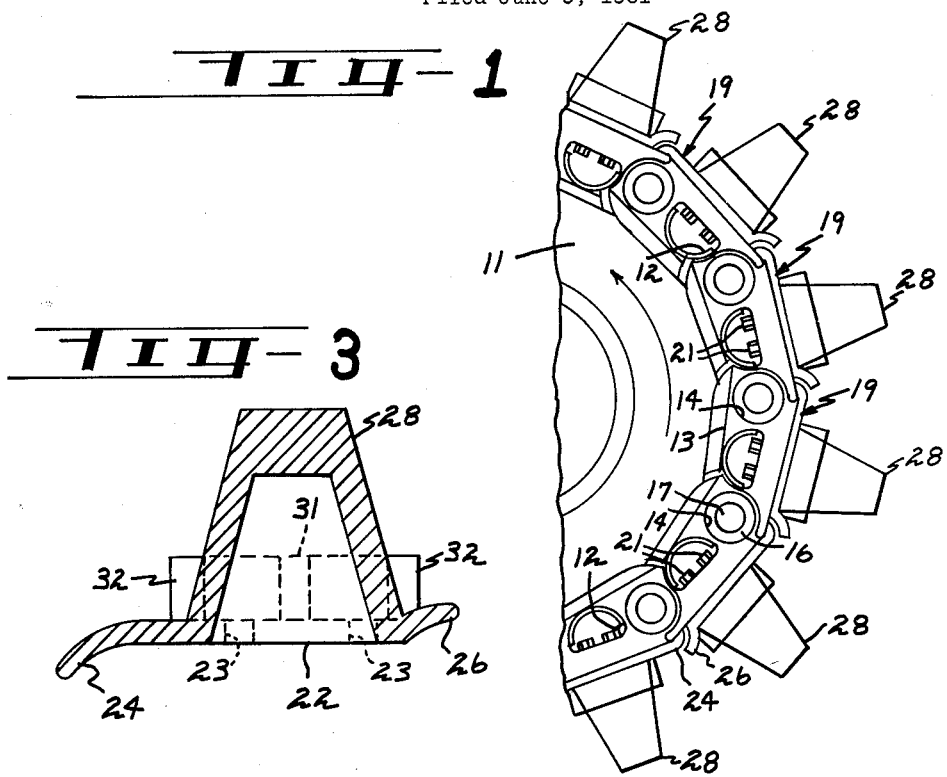
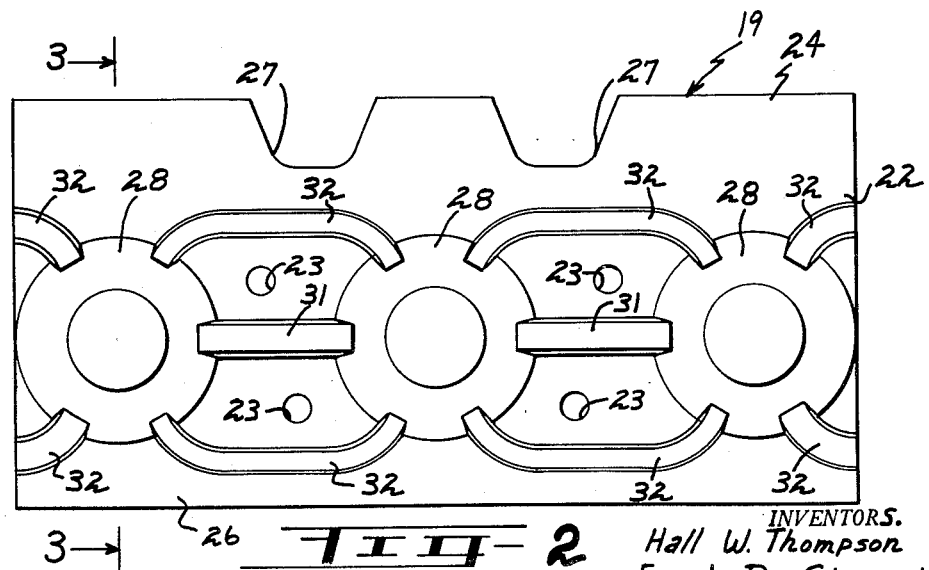
INVENTORS.
Hall W. Thompson
BY Evard R. Stewart
Jennings Carlile & Thompson
Attorneys

United States Patent Office 3,047,342
Patented July 31, 1962

3,047,342
TRACK SHOE FOR CRAWLER TYPE VEHICLE
Hall W. Thompson and Evard R. Stewart, Birmingham, Ala., assignors to Thompson Tractor Co., Inc., a corporation of Alabama
Filed June 9, 1961, Ser. No. 116,072
4 Claims. (Cl. 305—53)

This invention relates to a track shoe for endless crawler type vehicles and more particularly to such a shoe having projections thereon adapted to press and compact the earth over which the vehicle is operated.

Heretofore, it has been common in road construction to compact or tamp soil by the use of sheeps-foot rollers and the like which have been pulled in many instances by crawler type vehicles. The usual grouser shoes on the tracks of a common crawler vehicle have dug into the soil for traction purposes but have not tended to compact the soil to any extent. Grouser shoes are normally installed on a crawler tractor as original equipment and they may be easily replaced by our improved compaction shoes.

It is an object of the present invention to provide shoes for the track of a crawler type vehicle having spaced projections extending generally perpendicular from the outer surface of the shoe and adapted to press, tamp and compact the soil as the vehicle moves along.

A further object of our invention is to provide a track shoe for a crawler type vehicle having a plurality of projections extending in a direction generally perpendicular to the outer surface of the foot, the projections being aligned transversely of the direction of movement of the vehicle and substantially equally spaced from each other, and ribs extending between the projections having generally flat outer ends to aid in compaction and to strengthen the shoes.

A further object of our invention is to provide in a crawler type vehicle having endless tracks thereon for supporting the vehicle for movement along the ground, a plurality of track shoes mounted on links with each shoe having a plurality of frusto-conical projections on the outer surface thereof and ribs or bars on the outer surface of the shoe extending in a direction transversely of the direction of travel of the vehicle and between the projections, whereby the bars and projections tend to press the ground to compact it and to provide traction for the movement of the vehicle. Normally, the crawler type vehicle is used in towing other compaction tools.

Apparatus embodying features of our invention is shown in the accompanying drawing, forming a part of this application, in which:

FIG. 1 is a fragmentary elevational view of an endless track on a crawler type vehicle having our improved track shoes thereon;

FIG. 2 is a top plan view of our track shoe adapted to be placed on the track of a crawler type vehicle such as shown in FIG. 1; and, FIG. 3 is a sectional view taken generally along the line 3—3 of FIG. 2 and showing the frusto-conical projection on the track shoe.

Referring now to the drawing for a better understanding of our invention, we show in FIG. 1 a fragmentary side elevational view of a portion of a crawler type tractor comprising a sprocket 11 having teeth 12 about the periphery thereof for moving the tracks on the vehicle. Overlapping links 13 are shown having holes 14 therethrough. Bushings 16 in the holes 14 receive connecting pins 17 and connect adjacent overlapping links to each other. Inner links of the chain or track (not shown) are opposite links 13 and the teeth on sprocket 11 fit between the inner and outer links and engage bushings 16 to move the track. The chain just described is standard equipment and as such forms no part of our invention.

Our improved track shoes are indicated generally by the numeral 19. Each track shoe 19 comprises a generally flat supporting plate 22 having bolt holes 23 extending therethrough. Bolts 21 extend through holes 23 to secure shoes on links 13.

Plate 22 has a downwardly curved forward side 24 and an upwardly curved rearward side 26. Sides 24 and 26 overlap on adjacent shoes 19 to provide a close fit between adjacent shoes 19. Cutout portions 27 are provided in the downwardly curved side 24 to allow links 13 to fit therein.

Three frusto-conical shaped projections 28 extend upwardly perpendicularly from the generally horizontal surface of plate 22. Projections 28 are aligned transversely of the direction of travel of the vehicle. Intermediate, flat topped rib 31 extends between projections 28 and outer similar flat topped ribs 32 extend between projections 28 on each side of intermediate ribs 31. The ends of outer ribs 32 are inwardly curved and directed toward projections 28 as shown in FIG. 2 whereby ribs 32 are easily connected to the projections. The height of ribs 32 preferably is less than one-half the height of projections 28 and aid in tamping the soil as well as providing traction. It is noted that the downwardly curved side 24 of each shoe fits beneath the upwardly curved side 27 of the immediately preceding shoe as shown in FIG. 1 whereby a tight overlapping fit is obtained between the shoes. Ribs 31 and 32 are used primarily for grid type compaction as well as aiding in strengthening the shoe against deflection or failure in a direction generally parallel to the direction of travel. Ribs 31 and 32 are generally of a uniform thickness and have flat outer bearing surfaces to aid in compacting the soil over which the track operates. Further, ribs 31 and 32 provide protection for the heads of bolt 21 and are positioned therebetween. The arrow in FIG. 1 denotes the normal forward direction of travel of the vehicle.

From the foregoing, it will be understood that we have provided a track shoe for a crawler type vehicle which is adapted to tamp and compact soil as the vehicle moves therealong. This is accomplished by having a plurality of projections aligned transversely of the direction of movement of the vehicle with ribs extending between the projections. The ribs have flat outer bearing surfaces and aid in tamping the soil as well as strengthening the shoes between the projections. Also, the ribs protect the heads of the bolts securing the shoes to the track.

While we have shown our invention in only one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. The combination with an endless track of a crawler type vehicle, of a plurality of movable ground engaging shoes on the track and having generally flat outer surfaces, a plurality of substantially equally spaced projections on the outer surface of each shoe extending in a direction generally perpendicular to the outer surface of the shoe and aligned transversely of the direction of travel of the vehicle, and ribs on the outer surface of each shoe, each extending in a direction generally transversely of the direction of travel of the vehicle and between the projections, said ribs comprising an intermediate rib and an outer rib on each side of the intermediate rib spaced therefrom whereby the ribs and projections tend to compact the ground over which the track moves.

2. A track shoe adapted for use on the track of an endless track-type tractor comprising a relatively flat supporting plate, a plurality of equally spaced integrally formed projections aligned transversely of the direction of travel of the track on the outer surface of said plate and extending in a direction generally perpendicular to the outer surface of the plate, and a plurality of ribs on the outer surface of the plate extending between the projections and of a height less than the height of said projections as measured from the outer surface of the plate, said ribs being secured to adjacent projections.

3. The track shoe defined in claim 2 in which said ribs are flat-topped and comprise an intermediate rib and an outer rib on each side of said intermediate rib extending between the projections transversely of the direction of travel, and each of the outer ribs having inwardly curved ends extending toward the intermediate rib and integrally connected to the projections.

4. The track shoe defined in claim 2 in which said ribs comprise an intermediate rib and an outer rib on each side of said intermediate rib extending between and secured to the projections transversely of the direction of travel, and openings between the outer and intermediate ribs adapted to receive securing means for said shoe.

References Cited in the file of this patent

UNITED STATES PATENTS

| | | |
|---|---|---|
| 1,127,339 | Wise et al. | Feb. 2, 1915 |
| 2,050,936 | Ebing | Aug. 11, 1936 |
| 2,993,738 | Noble | July 25, 1961 |

FOREIGN PATENTS

| | | |
|---|---|---|
| 142,833 | Sweden | Nov. 3, 1953 |
| 343,247 | Switzerland | Jan. 30, 1960 |